United States Patent
Wang et al.

(10) Patent No.: US 7,654,246 B2
(45) Date of Patent: Feb. 2, 2010

(54) APPARATUS AND METHOD FOR CONTROLLING TRANSIENT OPERATION OF AN ENGINE OPERATING IN A HOMOGENEOUS CHARGE COMPRESSION IGNITION COMBUSTION MODE

(75) Inventors: Junmin Wang, Helotes, TX (US); Christopher J. Chadwell, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 264 days.

(21) Appl. No.: 11/867,427

(22) Filed: Oct. 4, 2007

(65) Prior Publication Data

US 2009/0090329 A1 Apr. 9, 2009

(51) Int. Cl.
F02B 1/14 (2006.01)
F02M 25/07 (2006.01)

(52) U.S. Cl. .................................. 123/305; 123/568.11

(58) Field of Classification Search ............ 123/568.11, 123/526.12, 568.15, 305, 435
See application file for complete search history.

(56) References Cited

U.S. PATENT DOCUMENTS

| 6,092,512 | A | * | 7/2000 | Ma | 123/568.15 |
|---|---|---|---|---|---|
| 6,536,407 | B1 | | 3/2003 | Denbratt | |
| 6,581,551 | B1 | | 6/2003 | Denbratt | |
| 6,910,459 | B2 | | 6/2005 | Sun et al. | |
| 6,923,167 | B2 | * | 8/2005 | Flowers | 123/568.15 |
| 6,951,211 | B2 | | 10/2005 | Bryant | |
| 6,953,030 | B2 | * | 10/2005 | Linderyd et al. | 123/568.15 |
| 7,080,613 | B2 | | 7/2006 | Kuo et al. | |
| 7,398,643 | B2 | * | 7/2008 | Cotton | 60/275 |
| 2005/0121009 | A1 | * | 6/2005 | Flowers | 123/568.15 |
| 2006/0196468 | A1 | | 9/2006 | Chang et al. | |
| 2006/0196469 | A1 | | 9/2006 | Kuo et al. | |
| 2006/0243241 | A1 | | 11/2006 | Kuo et al. | |
| 2007/0079817 | A1 | | 4/2007 | VanDyne et al. | |
| 2007/0124055 | A1 | * | 5/2007 | Kang et al. | 123/568.14 |

FOREIGN PATENT DOCUMENTS

WO   WO 2006118698   11/2006

\* cited by examiner

*Primary Examiner*—Stephen K Cronin
*Assistant Examiner*—Arnold Castro
(74) *Attorney, Agent, or Firm*—Gunn & Lee, P.C.

(57) ABSTRACT

When operating in a homogeneous charge compression ignition combustion mode, an in-cylinder condition guided fueling function and a dedicated exhaust burner disposed in an exhaust gas recirculation system of the engine are used to burn excess oxygen in recirculated exhaust gas and to achieve fast and smooth engine response during transient operation.

4 Claims, 4 Drawing Sheets

APPARATUS AND METHOD FOR CONTROLLING TRANSIENT OPERATION OF AN ENGINE OPERATING IN A HOMOGENEOUS CHARGE COMPRESSION IGNITION COMBUSTION MODE

BACKGROUND OF THE INVENTION

1. Technical Field

This invention relates generally to engines adapted to operate in a homogeneous charge compression ignition (HCCI) combustion mode and more particularly, to an apparatus and method for controlling HCCI combustion in an engine during transient operations.

2. Background Art

Homogeneous charge compression ignition (HCCI) is a mode of combustion in which a pre-mixed fuel/air charge is elevated in temperature during the compression stroke until the thermodynamic conditions in the pre-mixed charge are satisfactory for the initiation of combustion. HCCI combustion occurs when a lean homogeneous mixture of fuel and air begins combustion toward the end of the engine compression stroke. During transient operations, fueling control is very fast because the desired injection mass can be controllably delivered to each cylinder on a cycle-by-cycle basis. However, in a turbocharged engine having an exhaust gas recirculation system, turbo-lag, recirculated exhaust gas transport delays, and the filling-and-emptying dynamics of the combustion chambers, the in-cylinder conditions evolve at a much slower pace, typically occurring over several engine cycles. Even when the air-path responses are enhanced by a closed-loop controller, the in-cylinder conditions stabilize at a much slower pace than the change rate of the fueling. In order to increase engine output torque during on an up-transient change, the fueling rate is primarily determined by the desired BMEP (break mean effective pressure) and engine speed. Thus, mismatches can occur between the actual in-cylinder conditions and the fuel supplied to the cylinder during transient operations. For HCCI combustion, it is not desirable to have significant mismatches between in-cylinder conditions and fueling, because undesirable combustion behavior, such as misfire and knocking can occur.

Several methods have been proposed for transient control during HCCI combustion. For example, United States Patent Publication No. 2006/0196469A1, published Sep. 7, 2006 to Kuo et al. for a Method for Load Transient Control Between Lean and Stoichiometric Combustion Modes of Direct-Injection Engines With Controlled Auto-Ignition Combustion, describes a method for controlling gasoline-fueled direct-injected engines during transient operation in a HCCI mode. The described method synchronizes the change rates of pre-determined controlled inputs to the engine fueling rate. A similar publication, United States Patent Application Publication No. 2006/0196468A1, also published Sep. 7, 2006, to Chang et al. for a Speed Transient Control Methods for Direct-Injection Enginess With Controlled Auto-Ignition Combustion, proposes a control method in which controlled inputs are synchronized to changes in the current engine speed and also with any concurrent changes in the engine fueling rate. However, as noted above, although engine fueling rates can be adjusted very quickly, on a cycle-by-cycle basis, the intake air charge composition cannot be adjusted as quickly and therefore fueling and intake air charge mismatches occur. Moreover, in typical engine operation, and particularly in diesel engines, the exhaust gas stream contains a considerable amount of oxygen that was not consumed in the combustion process. Therefore, the recirculated exhaust gas contains oxygen that is added to the intake air introduced into the intake manifold of the chamber. Consequently, even with rapid fueling changes, the oxygen content of the intake manifold air charge is mismatched with the amount of fuel required to meet the increased BMEP demands, and misfire and knocking will occur during the up-transient excursion.

The present invention is directed to overcoming the above-described problems associated with transient operation control of an engine operating in a HCCI combustion mode. It is desired to have an apparatus and method in which the intake manifold air charge is coordinated to track a desired air path signal and thereby adjustably regulate the oxygen content of the intake charge. It is also desirable to have an in-cylinder condition guided fueling function and an apparatus and method whereby excess oxygen in the recirculated exhaust gas is consumed prior to reintroduction into the intake charge to achieve fast and smooth engine response during transient operation.

SUMMARY OF THE INVENTION

In accordance with one aspect of the present invention, an apparatus for an engine adapted to operate in a homogeneous charge compression ignition combustion mode includes a burner disposed in an exhaust gas recirculation system of the engine and a means for controllably injecting fuel into the burner in response to an up-transient engine operating condition.

Other features of the apparatus include the burner having a fuel injector in controlled communication with a source of fuel and a fuel injector controller adapted to receive a desired fueling input signal based on the oxygen content of recirculated exhaust gas, engine speed and load demand.

Another aspect of the present invention is a method for controlling an engine operating in a homogeneous charged compression ignition combustion mode that includes determining an up-transient condition in response to change in pedal position and engine speed and determining an intake air fraction of the intake air charge consisting of intake air and recirculated exhaust gas. The amount of excess oxygen in the recirculated exhaust gas is calculated in response to the determined intake manifold air fraction being greater than a desired intake manifold air fraction plus a predefined threshold value. The amount of fuel required to consume the excess oxygen in the recirculated exhaust gas is calculated and injected into a burner disposed in the exhaust gas recirculation system of the engine.

Other features of the method for controlling an engine operating in a homogeneous charge compression ignition combustion mode includes calculating the excess oxygen amount based on current engine operating parameters from either a predefined model or directly from at least one engine operating sensor, or a combination of both model and sensors.

BRIEF DESCRIPTION OF THE DRAWINGS

A more complete understanding of the apparatus and method for controlling transient operation of an engine operating in a homogeneous charge compression ignition combustion mode, in accordance with the present invention, may be had by reference to the following detailed description when taken in conjunction with the accompanying drawings, wherein.

DETAILED DESCRIPTION OF THE INVENTION

Figure 1:
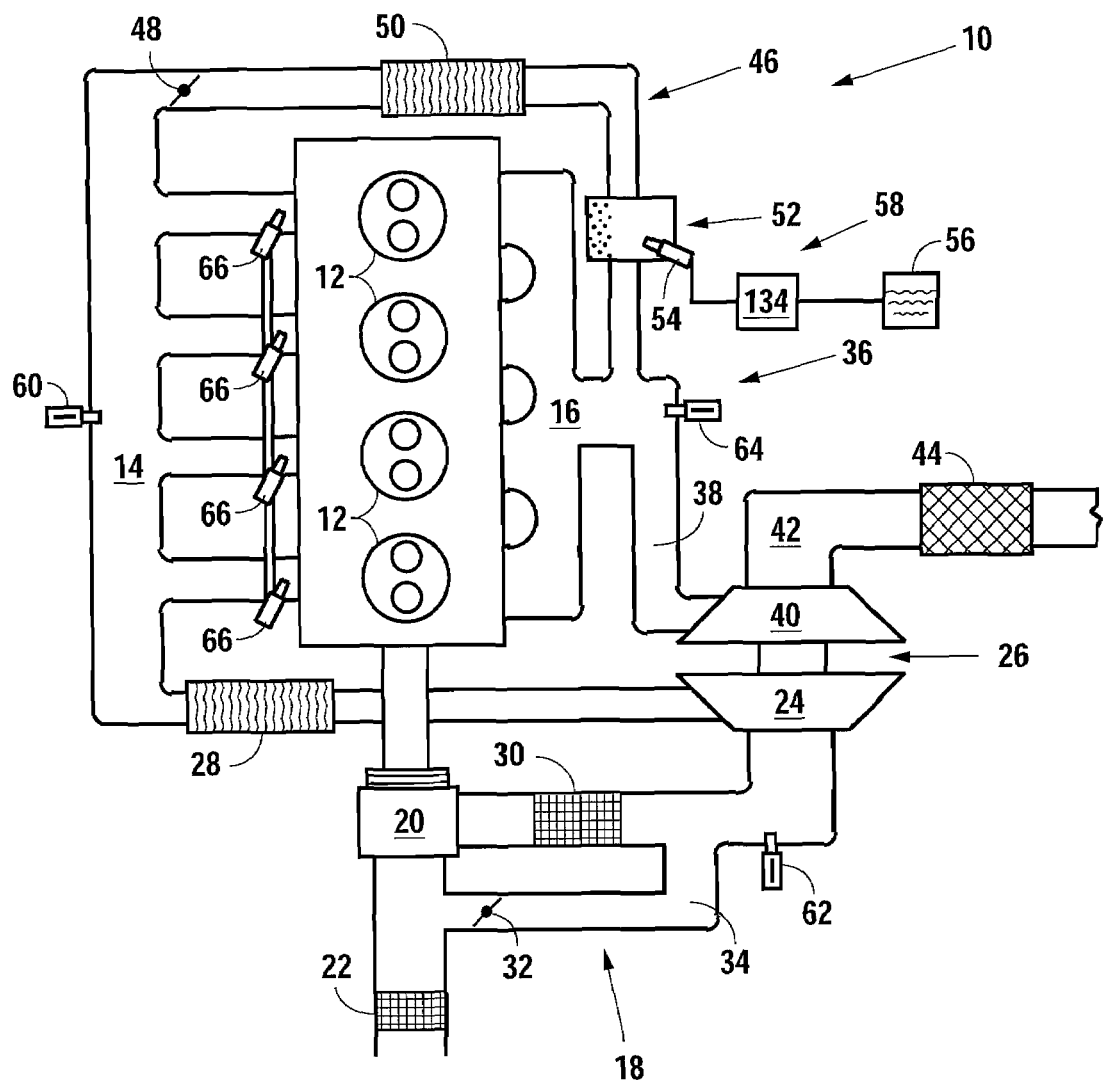
FIG. 1 is a schematic representation of a representative engine adapted to operate in a homogeneous compression ignition combustion mode in accordance with the present invention.

A representative internal combustion engine adapted to selectively operate in a HCCI combustion mode is generally indicated by the reference numeral 10 in FIG. 1. The engine 10 may be fueled with diesel fuel, gasoline, or a boutique fuel that is neither gasoline or diesel. The engine 10 has a plurality of combustion chambers 12, each of which are in fluid communication with an intake manifold 14 and an exhaust manifold 16. Ambient air is provided to the intake manifold 14 through an intake air system generally indicated by the reference numeral 18. In the illustrated engine 10, the intake air system 18 has a supercharger 20 that is adapted to draw intake air from the ambient environment through an intake air filter 22 and deliver compressed air to the intake port of a compressor stage 24 of a variable-geometry turbocharger (VGT) 26. An intercooler 28 is disposed in the intake air system 18 at a position between the discharge port of the compressor stage 24 and the intake manifold 14. A cooler 30 is positioned between the discharge port of the supercharger 20 and the inlet port of the compressor stage 24 to cool the compressed air discharged from the supercharger prior to further compression in the compressor stage 24 of the VGT 26. A bypass valve 32 is positioned in a bypass duct 34 to regulate the relative amount of intake air that passes through the supercharger.

An exhaust system, generally indicated by the reference number 36, has a first exhaust duct 38 extending between the exhaust manifold 16 and the inlet port of a turbine stage 40 of the VGT 26. After passing through the turbine stage 40 of the variable-geometry turbocharger 26, exhaust gas is directed through a second exhaust duct 42 to the ambient environment. Typically, a muffler or one or more aftertreatment devices 44 are positioned in the second exhaust duct 42 to treat the exhaust gas prior to discharge into the ambient environment.

The engine 10 also has an exhaust gas recirculation system, generally indicated by the reference numeral 46, that provides a controlled fluid passageway for the recirculation of exhaust gas between the exhaust manifold 16 and into the intake manifold 14. The amount of exhaust gas recirculated through the exhaust gas recirculation system 46 is controlled by an exhaust gas recirculation flow control valve 48. A recirculated exhaust gas cooler 50 is positioned in the exhaust gas recirculation system 46 between the exhaust manifold 16 and intake manifold 14 to cool the recirculated exhaust gas prior to introduction into the intake manifold. Importantly, in carrying out the present invention, the exhaust gas recirculation system 46 has a burner 52 and a means 58 for controllably injecting fuel into the burner in response to an up-transient condition when the engine 10 is operating in a HCCI combustion mode. The means 58 for controllably injecting fuel into the burner includes a fuel injector 54 in controlled fluid communication with a source of fuel 56 and, as described below in greater detail, a burner injector controller 134 that is operatively connected to the injector 54 to inject a controlled quantity of fuel into the burner 52 and consume excess oxygen present in the exhaust gas recirculated through the burner and into the intake manifold 14 during transient operation.

Figure 2:
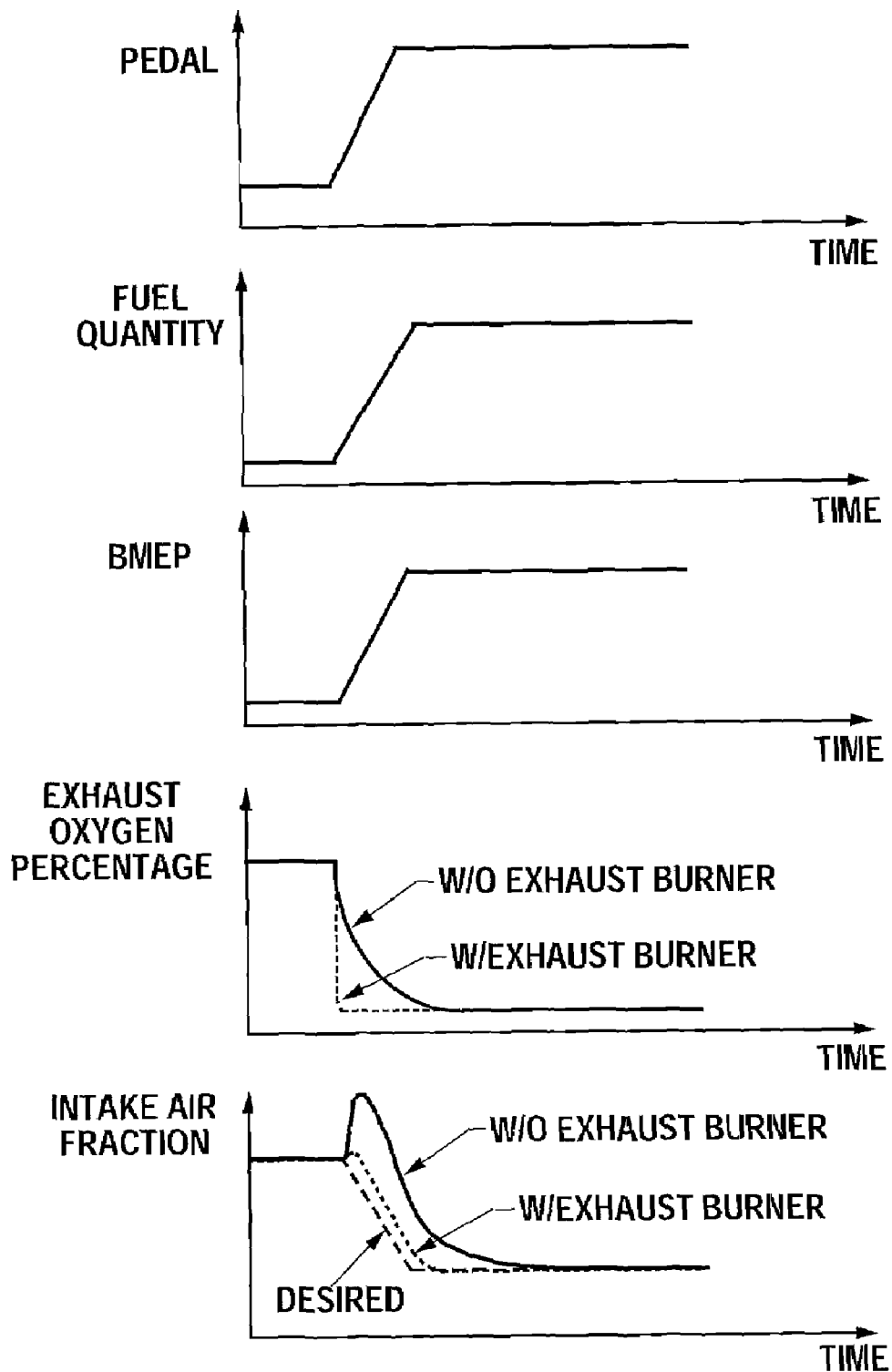
FIG. 2 is a graphical representation illustrating the effects of an exhaust gas burner during up-transient operation in a homogeneous charge compression ignition combustion mode in accordance with the present invention.

A plurality of pressure and/or temperature sensors 60, 62, and 64 are disposed respectively in the intake manifold 14, the intake air system 18, and the exhaust system 36 to provide pressure and temperature signals to the control system illustrated in FIG. 2.

Combustion behaviors are determined by two parts: the in-cylinder conditions and fueling parameters. In the illustrative engine 10, fuel is provided to each of the combustion chambers 12 by a fuel injector 66 positioned in the respective intake port of each of the combustion chambers. In a port fuel injection system, the effective fuel injection timing on engine combustion is very limited. Only the fuel injection quantity can be actively controlled with any degree of accuracy. Therefore, HCCI transient control heavily relies on the control of the in-cylinder conditions which are largely determined by the intake air charge which consists of two portions: intake air inducted into the intake manifold 14 through the intake air system 18 and recirculated exhaust gas inducted into the intake manifold 14 through the recirculated exhaust gas recirculation system 46.

Figure 3:
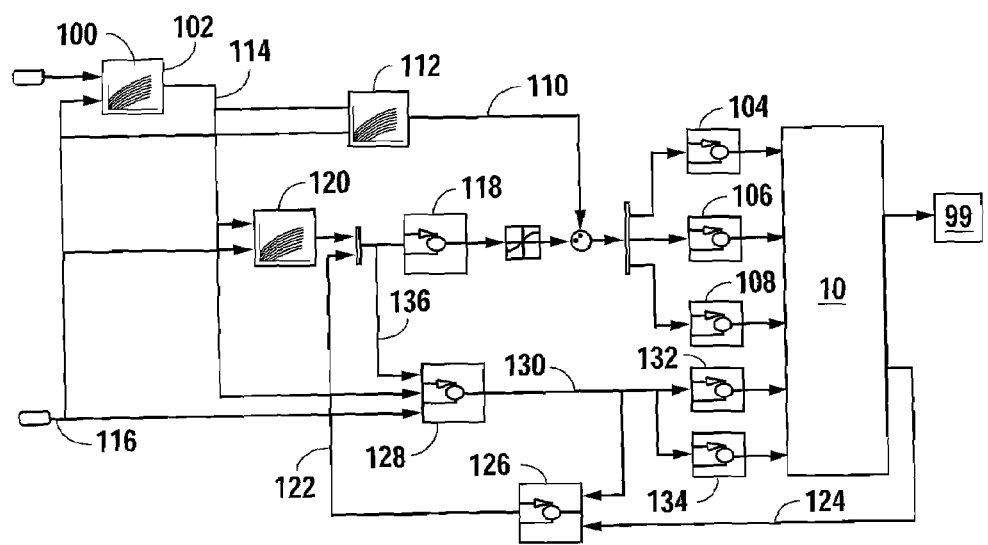
FIG. 3 is a diagram illustrating the overall control structure for controlling transient operation during operation in a homogeneous charged compression ignition combustion mode in accordance with the present invention.

Thus, one of the important in-cylinder conditions for HCCI engines is the in-cylinder oxygen rate, or conversely, the burned gas rate. In the illustrated engine 10, the in-cylinder oxygen rate is affected by the amount of recirculated exhaust gas redirected into the intake manifold 14 through the exhaust gas recirculation system 46. However, during up-transient operations (from light load to higher load), the exhaust gas recirculation (EGR) system 46 will not be able to achieve the desired in-cylinder burned gas rate. At light load, combustion is very lean and there is a significant amount of excessive unburned oxygen in the exhaust gas. During up-transient operation, as illustrated in FIG. 2, the excessive unburned air (oxygen) will be recirculated back to the intake manifold 14 along with the burned gas through the EGR system 46. Thus, the oxygen content of the intake manifold air, which includes the recirculated exhaust gas, is higher than the desired value. In an up-transient condition, there is an increase in pedal position accompanied by a corresponding increase in fuel quantity and in the BMEP. BMEP, the Brake Mean Effective Pressure, is the average (mean) pressure which, if imposed on the engine's pistons uniformly from the top to the bottom of each power stroke, would produce the measured (brake) power output. Thus, BMEP for a given engine can generally be associated with output torque, or load, 99 as represented in FIG. 3.

However, as illustrated in FIG. 2, during an up-transient excursion the exhaust gas percentage, indicated by the solid line, decreases at a slower rate than pedal position, fuel quantity or BMEP but will eventually reach the desired value. Likewise, the intake air fraction, i.e., the fraction of the intake charge that is provided by the ambient atmosphere, will initially be higher but will eventually, over a period of time longer than the duration of a normal transient operation, reach the desired value.

In a marked difference from other combustion modes, during HCCI operation the combustion burn rate and other behaviors are very sensitive to the in-cylinder air fraction, i.e., the amount of available oxygen. Excessive in-cylinder oxygen can cause engine knock and dramatically increase combustion noise. During an up-transient, the fresh air flow rate can be intentionally reduced to reduce the intake air fraction, but such a reduction of fresh air flow rate will decrease the total gas charge in the cylinders and cause misfire. Therefore, in accordance with the present invention, a solution for achieving tight intake air fraction tracking and control during up-transient operation, indicated by the short dashed lines in FIG. 2, is to provide a recirculated exhaust gas with less oxygen.

In the preferred embodiment of the present invention the exhaust gas burner 52, positioned between the outlet of exhaust manifold 16 and the recirculated exhaust gas cooler 50 in the exhaust gas recirculation system 46, is used to effectively burn the excess oxygen in the recirculated exhaust gas during severe up-transient operations. The fueling rate for the exhaust gas burner 52 is controlled by the burner injector controller 134, described below in more detail, based on the estimated oxygen amount in the exhaust either from models or from sensor measurements, such as an oxygen sensor positioned in the exhaust gas system 36. Excessive fueling for the exhaust gas burner 52 is not desirable from a fuel economy point of view, but any reduction in the excessive oxygen in the exhaust gas by the burner will be helpful in the control of the intake air fraction and resultant oxygen content of the intake air charge in the intake manifold 14, and therefore HCCI combustion and torque rise during the up-transient operation will be enhanced. The exhaust gas burner 52 is only active during severe up-transient operations and therefore the associated fuel quantity is not significant.

As noted above, for HCCI combustion, the in-cylinder total gas amount and oxygen amount (or burned gas amount) are important. In practice, the in-cylinder conditions are difficult to be measured directly for closed-loop control purposes. Accordingly, in carrying out the present invention appropriate air-path signals, such as intake manifold pressure, intake manifold air fraction, and exhaust manifold pressure, are selected as appropriate air-path signals for closed-loop tracking control and used to indirectly control the engine in-cylinder conditions for the HCCI engine 10.

In accordance with the present invention, HCCI engine transient control consists of three main subsystems, each of which are described below. The first subsystem is robust non-linear air-path control based on a control-oriented air-path dynamic model to coordinate air path actuators. More specifically, in the illustrative preferred embodiment of the present invention, the position of the bypass valve 32 and operation of the supercharger 20 and compressor stage 24 of the variable-geometry turbocharger 26 are controlled to make the in-cylinder conditions track the desired conditions, indicated by the long dashed lines in FIG. 2, during transient operations. The second subsystem includes an in-cylinder condition guided fueling control. The third sub-system includes the exhaust gas burner 52 for transient operation assistance.

A preferred embodiment of the overall control structure is illustrated in FIG. 3. From a pedal position signal 100, the desired BMEP controller 102 for the engine 10 is given. The in-cylinder conditions are controlled by a bypass valve controller 104 that controls the operation of the bypass valve 32, a VGT controller 106 to control the operation of the variable-geometry turbocharger 26, and an EGR flow controller 108 that controls the operation of the EGR flow control valve 48.

The air-path actuators 104, 106, 108 are part of a closed-loop system with two input contributions. The first contribution is a feedforward contribution signal 110 provided by a feedforward controller 112 that receives input signals representative of the desired BMEP 114 provided by the desired BMEP controller 102 and an engine speed or RPM signal 116. The second contribution governing control of the air-path actuators 104, 106, 108 is a closed-loop feedback contribution which is determined by a non-linear in-cylinder air-path controller 118. The air-path controller 118 receives an input signal 136 that is primarily determined from a desired air-path map 120 based on the desired BMEP signal 114 and the engine speed signal 116. The air-path controller 118 also receives input from one or more measured or estimated signals 122 that are representative of current engine operating conditions. The signals 122 are derived from signals 124 from engine sensors, such as the pressure or temperature sensors 60, 62, 64 or other sensors, or predefined models based upon measured engine operating conditions as determined by an estimator/observer circuit 126. Thus, active closed-loop air-path control of the incoming air flow can be ensured even with un-modeled dynamics, parametric uncertainties, fuel property variations or other disturbances.

As noted above with reference to FIG. 2, during transient operation, fueling control can be carried out very quickly with the desired injection mass delivered to each of the cylinders 12 on a cycle-by-cycle basis. However, due to the lag in turbocharger response, the delay associated with an exhaust gas recirculation transport, and the filling and emptying dynamics of individual cylinders, the in-cylinder conditions evolve at a much slower pace over multiple cycles. Even with the enhanced air-path responses provided by the air-path controller 118, in-cylinder conditions lag behind the change rate of the fueling. Thus, in the illustrative preferred embodiment of the present invention, the desired BMEP signal 114, the engine RPM signal 116, and the desired air-path signal 136 provide input values to a fueling map and correction function controller 128 that delivers desired fueling signals 130 to a fuel injection controller 132 and a burner injection controller 134.

To compensate for the slow in-cylinder condition dynamics, the fueling map and correction function controller 128 uses the desired air-path signal 136 as representative of the desired and actual air-path signals during transient operation. In the fueling map and correction function controller 128 the in-cylinder conditions are defined as a multi-dimension vector and weighting factors applied to the tracking errors of the air-path signal 136 to formulate a representative in-cylinder condition tracking error, which is then used to guide the fuel injection mass during transient operation.

Figure 4:
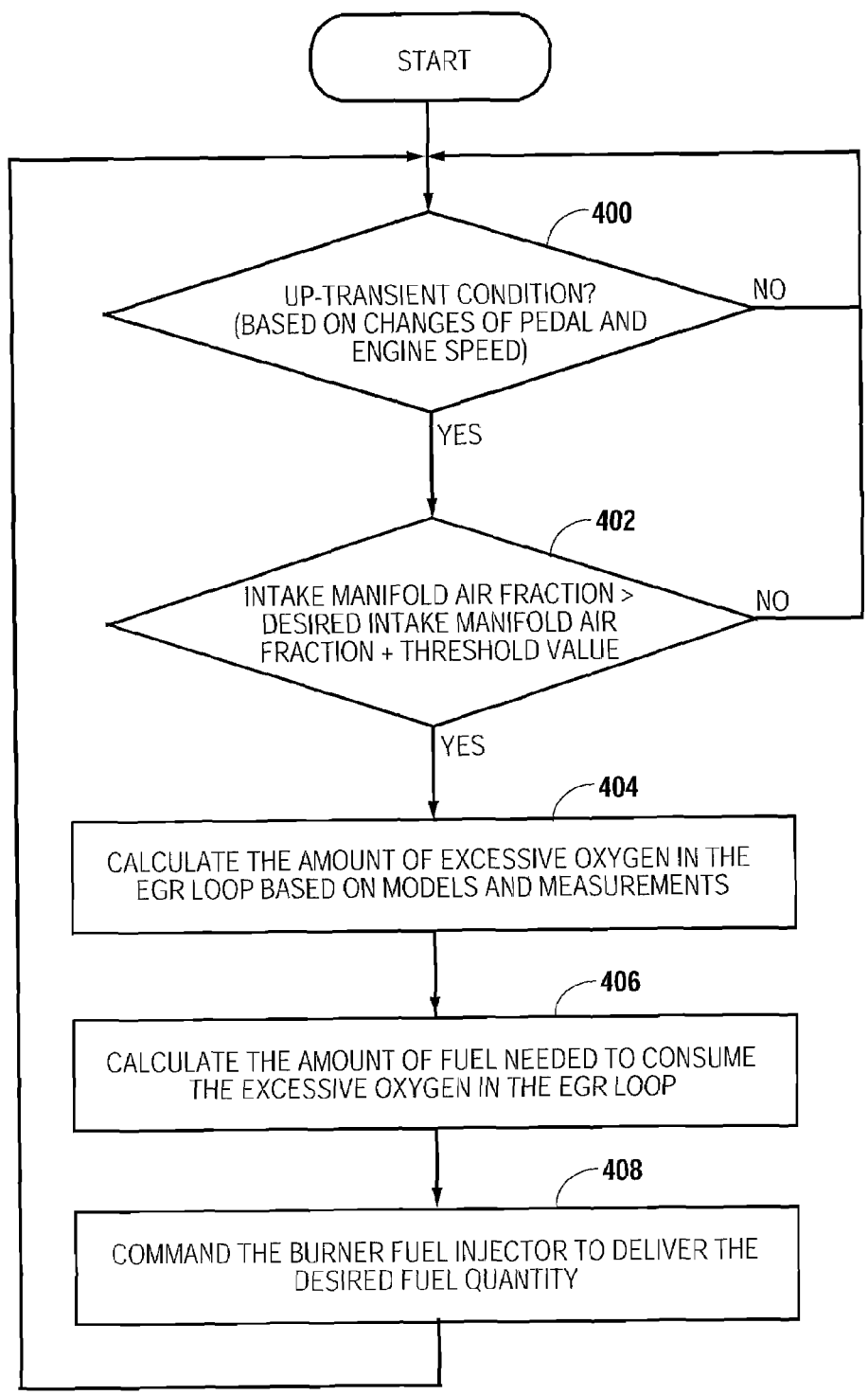
FIG. 4 is a flow chart of the control logic governing operation of the exhaust gas burner in accordance with the present invention.

The method for controlling transient operation of the engine 10 when operating in an HCCI combustion mode is illustrated in the flow chart shown in FIG. 4. When an up-transient condition is sensed, based upon changes in the pedal position and/or the engine speed as illustrated at Block 400, the intake manifold air fraction, i.e., the portion of the intake charge that is intake air from the ambient environment, is determined as indicated at Block 402. If the intake manifold air fraction is greater than a desired intake manifold air fraction, plus a predefined threshold value to avoid unnecessary burner operation during minor transients, the amount of excess oxygen in the exhaust gas transported in the exhaust gas recirculation loop is calculated as indicated at Block 404. The excess oxygen amount value can be made by either direct measurement from one or more engine sensors, such as an oxygen sensor positioned in the exhaust gas stream, by a predefined model with inputs from one or more engine operating parameters, or a combination of sensor measurement and modeling. The amount of fuel needed to consume the excess oxygen in the exhaust gas recirculation loop 46 is then made by the fueling map and correction function controller 128 as indicated at Block 406, and the appropriate fueling signal 130 is directed to the burner fuel injector 54 to deliver the desired fuel quantity as indicated at Block 408.

The present invention is described above in terms of a preferred illustrative embodiment that is applicable to all internal combustion engines adapted to operate in a HCCI combustion mode. It will be obvious to those skilled in the art that modifications can be made to the engine and control system described herein without departing from the spirit of the invention. For example, the supercharger 20 and associated cooler 30, along with other components of the described embodiment may be eliminated. Additional components, such as specific exhaust aftertreatment devices could be added, along with additional engine sensors which may modify the described control arrangement while still accomplishing air-path control, fuel injection, and error tracking during transient operation. Such changes, additions, or alterations could be used in carrying out the present invention.

Other aspects, features and advantages of the present invention may be obtained from a study of this disclosure and the drawings, along with the appended claims.

What we claim is:

1. An apparatus for an engine adapted to selectively operate in a homogeneous charge compression ignition combustion mode, said engine having an intake air manifold in controlled fluid communication with a source of ambient air, an exhaust manifold in fluid communication with an exhaust system, at least one combustion chamber in controlled fluid communication with said intake manifold and said exhaust manifold, and an exhaust gas recirculation system in controlled fluid communication with said exhaust manifold and said intake manifold, said apparatus comprising:

a burner disposed in said exhaust gas recirculation system; and, means for controllably injecting fuel into said burner in response to an up-transient condition when said engine is operating in said homogeneous charge compression ignition combustion mode, said means for controllably injecting fuel into said burner comprising a fuel injector in controlled fluid communication with a source of fuel, and a fuel injector controller interposed the source of fuel and said fuel injector and adapted to receive a desired fueling input signal based on the oxygen content of recirculated exhaust gas, engine speed and load demand, said desired fueling input signal being corrected to track changes in the intake air and recirculated exhaust as introduced into the intake manifold during operation in said up-transient condition.

2. The apparatus, as set forth in claim 1, wherein said exhaust gas recirculation system includes an exhaust gas recirculation flow control valve and said burner is disposed in said exhaust gas recirculation system at a position between said exhaust gas recirculation flow control valve and said exhaust manifold.

3. A method for controlling an engine operating in a homogeneous charge compression ignition combustion mode, comprising:

determining an up-transient condition in response to a change in at least one of pedal position and current engine speed;

determining the intake manifold air fraction of an intake charge comprising intake air and recirculated exhaust gas;

calculating the amount of excess oxygen in said recirculated exhaust gas in response to said intake manifold air fraction being greater than a desired intake manifold air fraction plus a predefined threshold value;

calculating the amount of fuel required to consume said excess oxygen in said recirculated exhaust gas; and, injecting said calculated amount of fuel into a burner disposed in an exhaust gas recirculation system of said engine.

4. The method for controlling an engine operating in a homogeneous charge compression ignition combustion mode, as set forth in claim 3, wherein said calculating the amount of excess oxygen in the recirculated exhaust gas includes obtaining an excess oxygen amount value based on current engine operating conditions derived from at least one of a predefined model and direct measurement by at least one engine parameter sensor.

\* \* \* \* \*